Dec. 3, 1940.   A. F. SPITZGLASS   2,223,837
REGULATING SYSTEM
Filed Nov. 7, 1936   5 Sheets-Sheet 1

Inventor
Albert F. Spitzglass
by McConkey & Booth
Attorneys

Dec. 3, 1940.　　　A. F. SPITZGLASS　　　2,223,837
REGULATING SYSTEM
Filed Nov. 7, 1936　　　5 Sheets-Sheet 4

Inventor
Albert F. Spitzglass
by McConkey & Booth
Attorneys

Dec. 3, 1940.  A. F. SPITZGLASS  2,223,837
REGULATING SYSTEM
Filed Nov. 7, 1936  5 Sheets-Sheet 5
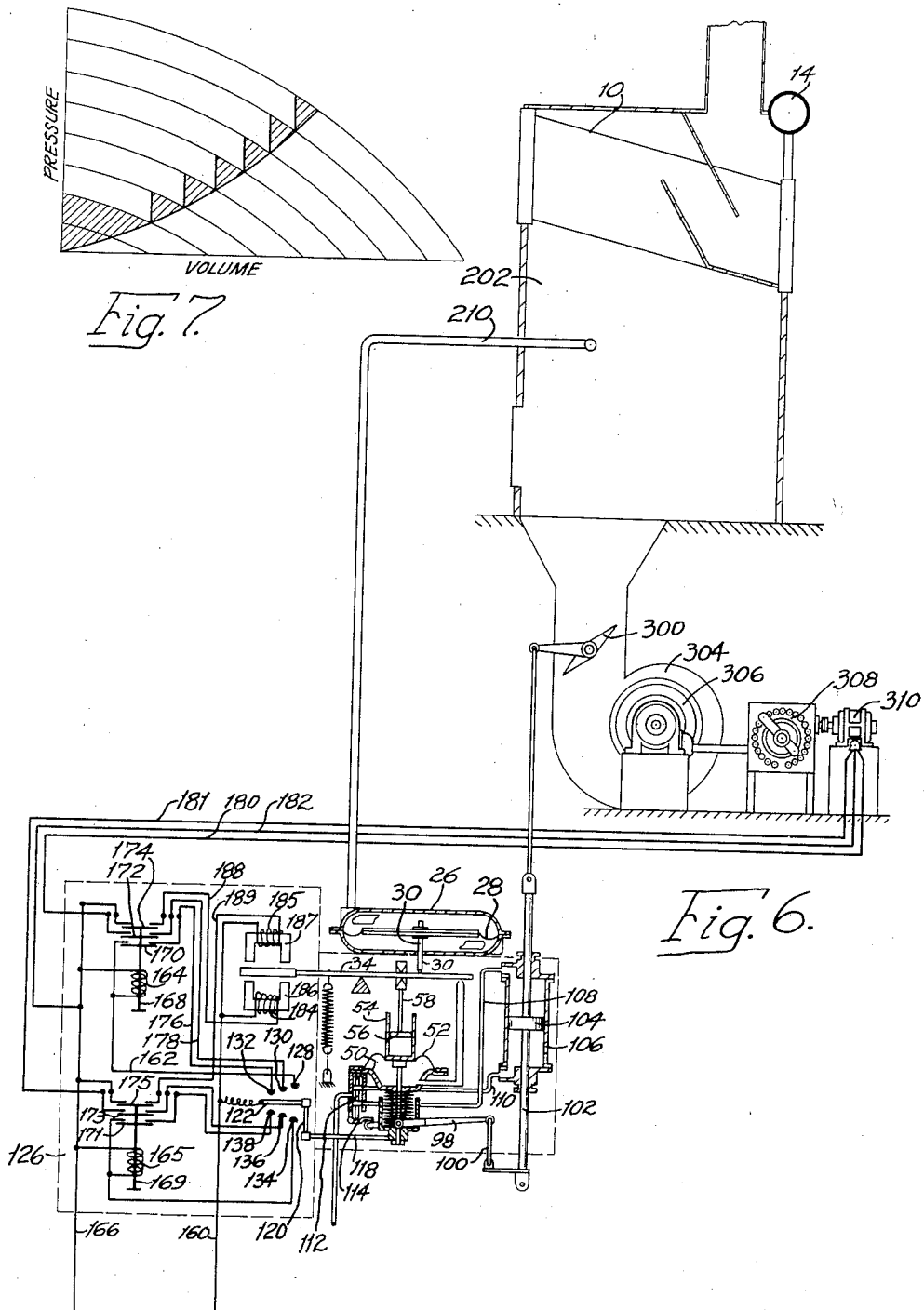
Inventor
Albert F. Spitzglass
by McConkey & Booth
Attorneys Patented Dec. 3, 1940

2,223,837

UNITED STATES PATENT OFFICE 2,223,837

REGULATING SYSTEM

Albert F. Spitzglass, Chicago, Ill., assignor to Republic Flow Meters Company, Chicago, Ill., a corporation of Illinois Application November 7, 1936, Serial No. 109,662

12 Claims. (Cl. 236—74)

This invention relates to the regulation of power plants and the like, where there are boiler pressures, steam pressures, and other conditions which are subject to fluctuations, and which it is desired to control by bringing about compensating variations in fuel supply, air flow, and other factors affecting the conditions it is desired to control.

An object of the invention is to provide simple and accurate electrical control of one or more of these factors, by the use of a reversible or multi-speed motor having a plurality of circuits, and controlling the circuits selectively, and preferably also as to length of operative actuation, by balance means affected by the condition it is desired to control.

I prefer to provide two sets of contacts for the circuits which are selectively opened and closed by the swing of the balance means in one direction or the other and which operate to close auxiliary circuits serving to initiate the desired actuation of the motor and also serving to actuate holding means to insure actuation of the motor for a desired time of operation; the auxiliary circuits also serve to control means such as solenoid magnets or the like arranged to return the balance means toward neutral position in anticipation of the change being produced in the condition being controlled. The energized circuits are preferably opened automatically by the return of the balance means toward neutral position.

The various contacts for the different circuits are preferably adjustable, for use in controlling different factors of operation of a boiler or the like, and in the illustrated arrangements they are all of a yielding nature and arranged at different points in the stroke of a part correlated with the balance means, so that they are opened and closed in the desired sequence. A number of features of novelty of the invention relate to these circuits and their arrangement, and to the novel effects of the spacing and arrangement of the contacts for opening and closing the different circuits.

One especially important feature of the invention relates to the utilization of a regulating system of this character in correlating two related factors in the operation of a boiler or the like, one being controlled in a sort of step by step manner by the above-described electrical controls and the other being directly and continuously controlled by the balance means directly and giving what may be regarded as a close or vernier adjustment to smooth out the steps of the electrical actuation.

For example, the electrical control may govern the speed of a multi-speed motor for means such as a fan for supplying air to the power plant, while the balance means directly controls a damper or similar device for giving a smooth and close control of the air supply regardless of the motor speed. In this case my novel system is especially advantageous, in that the opening and closing of the damper can be controlled to give accurate and immediate compensation for the changes in the pressure of the air supply due to changes in motor speed, in a manner avoiding any sudden changes which might injuriously affect the operation of the power plant.

Other objects and features of the invention, including certain improvements in the construction of the regulator or balance means proper, and other novel combinations and desirable arrangements, will be apparent from the following description of the arrangements illustrated in the accompanying drawings, in which:

Figure 6 is a similar diagram illustrating the control of a multi-speed motor; and Figure 7 is a pressure diagram illustrating the effect of the regulator on the air pressure.

Figure 1:
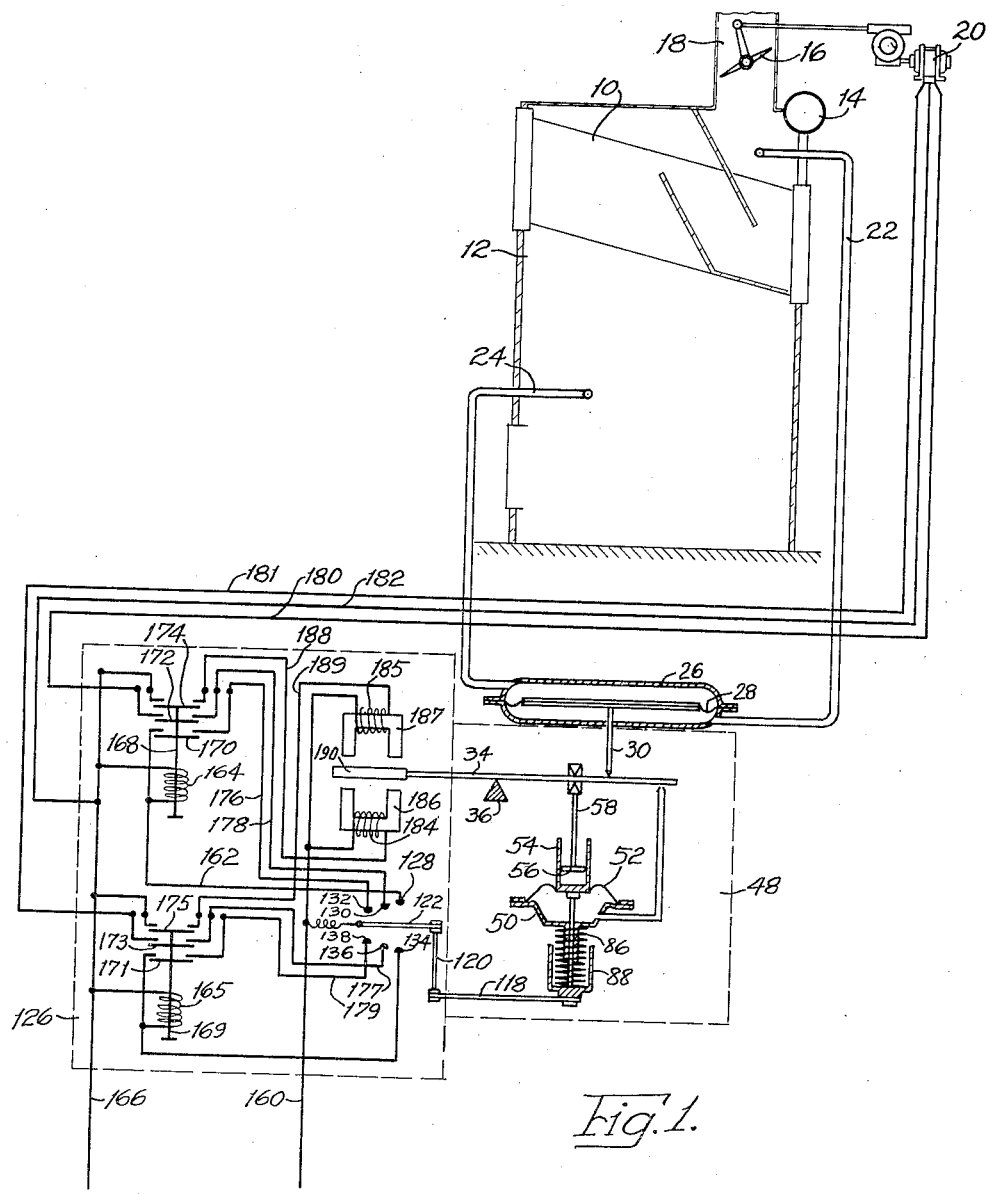
Figure 1 is a diagram showing a power plant and the above-described electrical control system therefor controlled by balance means affected by a differential of pressure across the tubes of the boiler.

Figure 1 illustrates part of a power plant including a boiler (not completely shown) for water heated to supply steam in a boiler or tube assembly 10 in a furnace 12, the fuel supply for the furnace being varied (by well-known regulating means not here shown) according to variations in the steam pressure in the boiler or a drum 14 connected thereto. The air supply is to be varied to correspond to variations in the supply of fuel, by the adjustment of a damper or the like 16, in a stack 18, opened and closed by a reversible electric motor 20.

It is here desired to provide for automatic adjustment of the damper 16 to preserve substantially constant, or within close predetermined limits, as the supply of fuel is varied, pressure drop between conduit connections 22 and 24 shown arranged across the tube assembly 10 from each other, for example one opening just above the furnace grate and the other just below the stack 18.

The conduits 22 and 24 are connected to a casing 26 respectively below and above a diaphragm 28 forming part of a regulator or balance means shown diagrammatically in Figure 1 and in detail in Figures 2 and 3, and more fully described below, and which is of the same general construction as the regulator described in O'Connor Patent No. 2,039,924, granted May 5, 1936.

Figure 2:
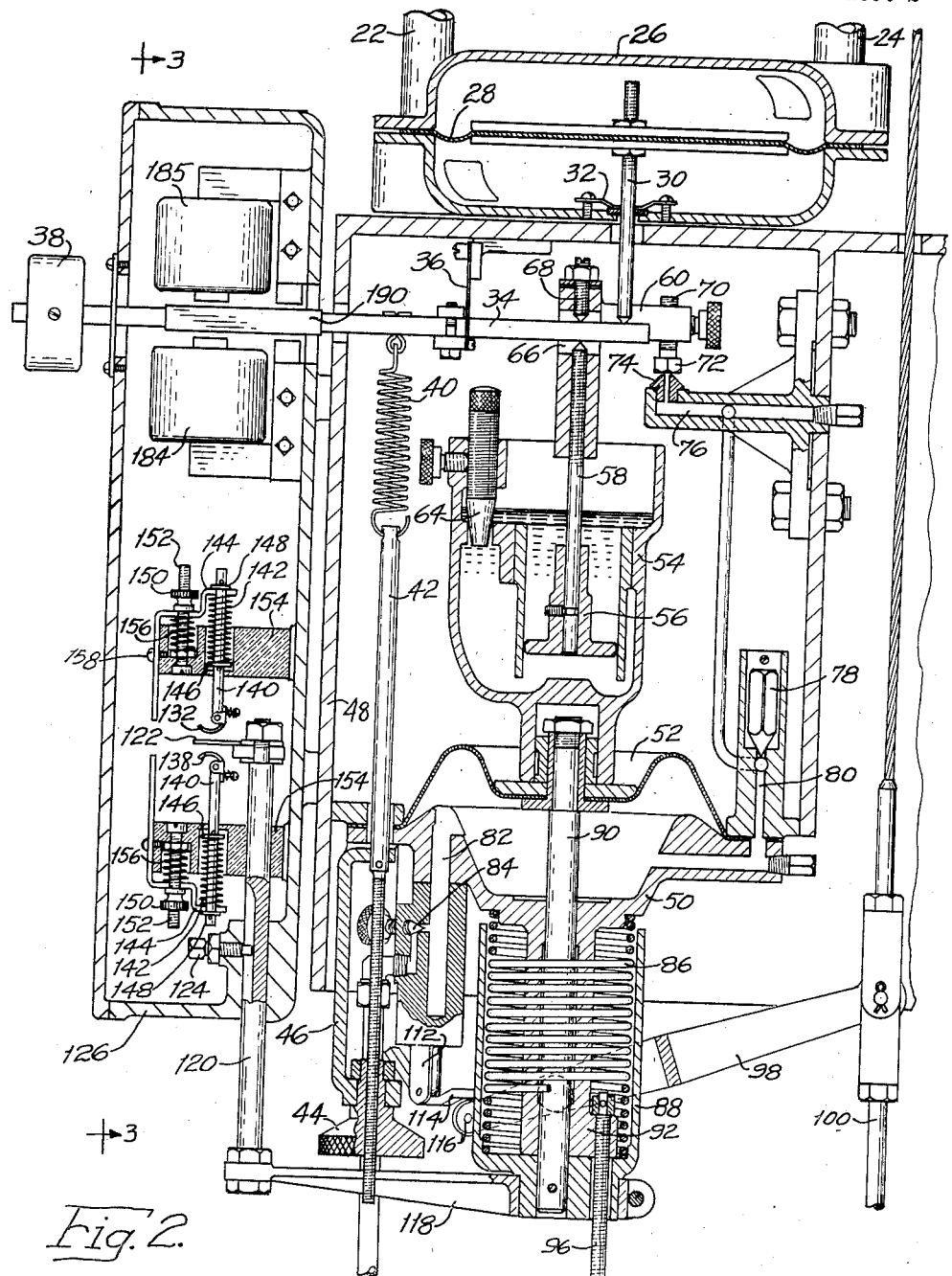
Figure 2 is a vertical section through the regulator proper, or balance means, shown diagrammatically in Figure 1.
Figure 3:
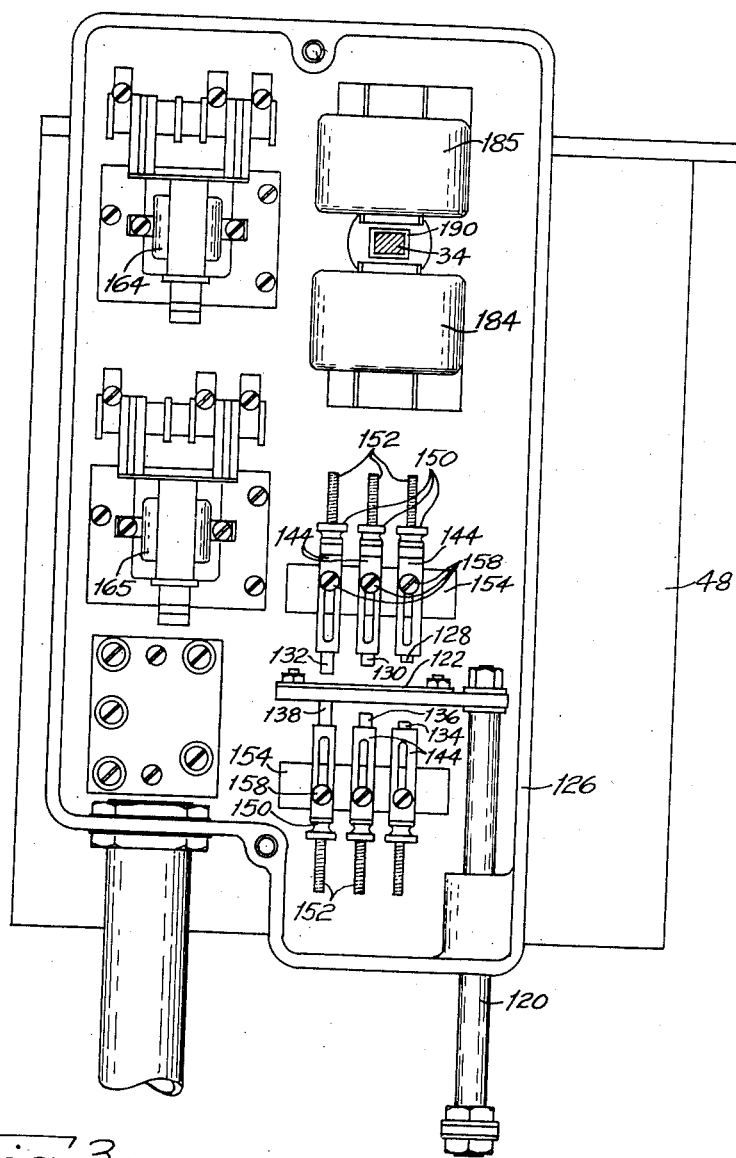
Figure 3 is an elevation of the regulator, looking from left to right in Figure 2, and with the end plate of the regulator removed.
Figure 4:
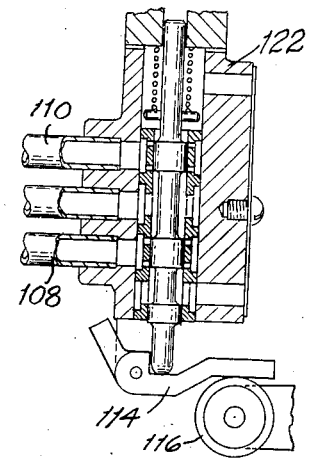
Figure 4 is a detail section through the pilot valve of the regulator.

In the arrangement illustrated in Figures 1 and 2 the diaphragm 28 is actuated by the differential pressure to operate a thrust rod 30 adjustably connected to the diaphragm 28, and provided with a small sealing diaphragm 32, and bearing on a weigh-beam 34 fulcrumed at 36, and which forms the active element of the balance means. The weigh-beam 34 is urged in a counterclockwise direction, normally just balancing the thrust from the diaphragm 28, by means such as an adjustable weight 38 and a tension spring 40 connected to a rod 42 having its lower end threaded for adjustable engagement with a nut 44 rotatably supported by a guide bracket 46 depending from the machine frame 48.

The machine frame 48 also carries, below the weigh-beam 34, an expansible chamber type of power device, shown as comprising a fixed base 50 with its top closed off by a power diaphragm 52. The diaphragm 52 has mounted thereon the cylinder 54 of a dashpot, the piston 56 of which is connected, by a rod 58 or the equivalent, to a bracket 60 adjustably mounted on the end of the weigh-beam 34. The dashpot has a bypass around the piston 56 which is adjustably controlled by a needle valve or the like 64.

The bracket 60 is formed with a slot 66 embracing the weigh-beam 34, and vertical adjustment of the bracket on the weigh-beam is provided by threading the bracket on the pointed upper end of the rod 58, and providing a cooperating pointed clamp screw 68 in alinement therewith. The bracket 60 carries an adjustable screw 70, formed with a flat head 72 controlling the effective size of an orifice 74, or equivalent outlet, leading from a chamber 76 shown communicating, under the control of a needle valve 78, with a passage 80 leading from the space between the diaphragm 52 and base 50.

Compressed air is fed into this space continuously through a passage 82 controlled by a needle valve 84 (which may be closed to shut off the air supply when the regulator is being operated by hand), so that the pressure upwardly on the diaphragm 52 is decreased by lifting the control member 72 and is increased by the lowering of member 72. This pressure is balanced by a compression coil spring 86 confined between the base 50 and a protective cup 88 pinned to the lower end of a piston rod 90 secured to the diaphragm 52 and sliding endwise through a bearing in the base 50 and an integral bearing extension 92 depending therefrom.

When the air pressure is shut off by closing the valve 84, the regulator may be actuated manually by turning a hand-wheel 94 attached to a rod 96 threaded into the extension 92 and passing loosely through an opening in the bottom of the cup 88. When there is no air pressure acting on the diaphragm 52, the spring 86 holds the cup 88 yieldingly against the hand-wheel 94. The cup 88 has pivoted thereto a yoked portion of a return motion lever 98, one end of which is connected by a rigid link 100 with the piston rod 102 (Figure 5) of a power piston 104 in a power cylinder 106. The supply of air for the cylinder 106, through conduits 108 and 110, is controlled by a pilot valve 112 yieldingly urged downwardly against a pivoted operating lever 114, the end of which rests on a roller 116 carried by the end of the lever 98.

By this arrangement, vertical movement of the diaphragm 52 rocks the lever 98 about its connection to link 100, to shift the pilot valve 112 in the usual manner to supply air through one or the other of the conduits 108 or 110 to the power cylinder 106. Thereupon piston 104 is shifted by the air in one direction or the other, rocking the return lever 98 in a direction to close the pilot valve again.

Figure 5:
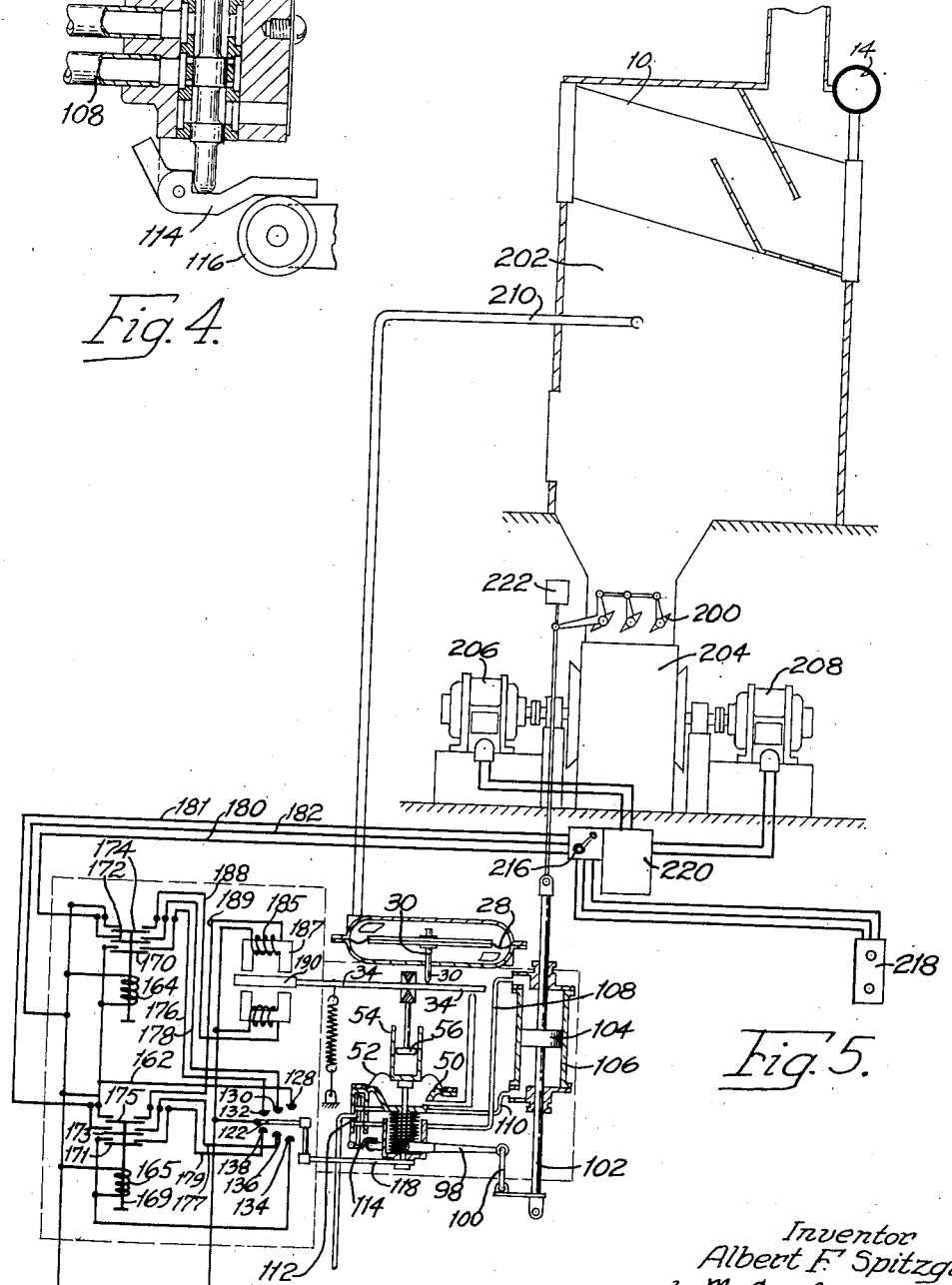
Figure 5 is a diagrammatic section showing the regulator correlating the operation of dampers or the like for the air supply with a two-speed motor.

The above-described power cylinder mechanism is not shown in Figure 1, as in the arrangement of that figure it is only desired to utilize the movements of diaphragm 52 (and therefore of cup 88) to control the circuits for the motor 20, and the power cylinder mechanism is therefore either disconnected or merely operates idly. Figures 5 and 6, however, show arrangements in which use is made of the power cylinder mechanism to operate a device which is to be correlated with the control of the motor circuits.

In order to control these circuits, the cup 88 (or other part moving with the diaphragm 52 or its equivalent) has rigidly clamped or otherwise secured thereto an arm or bracket 118 carrying a thrust plunger 120, carrying a contact plate 122. A key 124 (Figure 2) carried by a switch housing 126 may be provided to insure that plunger 120 will not turn. The contact plate 122 cooperates with upper and lower sets of three contacts each, indicated at 128, 130, 132, 134, 136, and 138, set at different heights.

As shown in Figure 2, each of these contacts may be in the form of a finger pivoted on the end of a plunger 140 urged toward the plate 122 by a spring 142 confined between a bracket 144 and an abutment on the plunger 140. This abutment may be in the form of a washer 146 seated against a pin passing through the plunger. A similar abutment 148 on the end of the plunger seats against the bracket 144 and limits the movement of the plunger under the influence of the spring 142.

The vertical position of each contact may readily be adjusted by shifting the position of its bracket 144. To this end, each bracket is engaged by a nut 150 threaded on a stem 152 mounted in a support 154 of insulating material, and a coil spring 156 is sleeved on the stem 152 between the bracket 144 and the support 154. The adjusted position of the bracket 144 is maintained by a screw 158 threaded into the side of the support 154 through a slot in the bracket. It will be noted that manipulation of nut 150, when screw 158 is loosened, shifts the entire plunger assembly.

As the contact arm 122 moves up or down, due to deflection of balance lever 34, nothing happens due to its engagement with contacts 132 and 130 or 138 and 136, as the case may be, until contact 128 or 134 is engaged. This closes a circuit from one of the line wires 160 through 122 and (for example) contact 128, to a wire 162 and through a solenoid 164 to the other line wire 166.

This energizes the solenoid, raising the core 168 and closing three switches 170, 172, and 174.

The closing of the switch 170 closes a circuit 160—122—132—176—170—164—166, thereby keeping the core raised until contact is broken at the lowermost contact 132. This may be called the "holding circuit," since it holds the three switches closed until contact is broken at 132.

The closing of the switch 172 closes a circuit 160 — 122 — 130 —178—172—180—20—182—166. This actuates the motor 20 in the proper direction to change damper 16 to compensate for the change in the pressure difference between 22 and 24. This circuit is opened by breaking the contact at 130.

The closing of the switch 174 closes a circuit from 160 through the coil 184 of an electromagnet 186, through a lead 188 and switch 174 to the line 166. This circuit remains closed until the breaking of the contact at 132 opens the three switches 170, 172 and 174.

The electro-magnet 186 acts on an iron armature 190 on the end of the balance lever 34 and draws the balance lever back toward its normal position without waiting for the pressure difference at 22—24 to be corrected. There is, however, a considerable time interval (adjustable by shifting the brackets 144) during part of which the damper 16 is being corrected, and during all of which the magnet 186 acts on the balance lever 34 to anticipate the effect of the correction of the position of the damper 16.

At the end of this time interval, when contact is broken at 132, the balance lever 34 is again free to swing in response to the pressure difference between 22 and 24. If the correction made is not sufficient, the balance lever 34 will again swing upwardly to close the contacts 132, 130, 128, and the above cycle will be repeated. Ordinarily the contacts are so adjusted that in normal operation there is no chance of overadjustment; however, if this should occur, it would be corrected for by a reverse adjustment cycle as described below.

When the pressure difference 22—24 changes in the opposite sense, and depresses the balance lever 34, a corresponding reverse cycle causing corrective operation of the motor 20 in the opposite direction takes place.

Closing of the contacts 138 and 136 as the arm 122 moves down does not cause any action. Closing of the contact 134 closes a switch circuit 160—122—134 solenoid 165—166, raising the solenoid core 169 and closing the switches 171, 173, and 175. This closes a holding circuit 160—122—138—189—171—165—166, a magnet circuit 160—185—189—175—166, and a motor circuit 160—122—136—173—181—20—182—166. It is believed that the operation during this cycle will be understood from the previous description.

Figure 5 shows my novel regulator used to correlate the position of shutters or dampers 200, controlling the flow of air to a furnace 202 from a suitable blower 204, with the use of low and high speed motors 206 and 208 (or to control the speed of a two-speed motor). The control diaphragm 28 is in this case affected by atmospheric pressure on its lower face, and by furnace pressure (through conduit 210) on its upper face.

When the device is operating with the slow speed motor 206 running and as the furnace pressure drops, as the load on the furnace increases and the supply of fuel is correspondingly increased, by the usual regulator mechanism (not shown), the dampers 200 finally reach a fully-opened position. This shifts the bracket 118 and contact arm 122 downwardly to close all three contacts 134, 136, and 138, thereby closing the circuit for the high speed motor and opening that for the low speed motor.

The three previously-described leads 180—181—182 in this case extend to a switch-over box 216, to which they are connected in parallel with the circuits from a manually-operated switch such as a set of push-buttons 218, so that the control of the motors 206 and 208 may be either manual or automatic, as desired. The leads from the switch-over box 216 go through the usual motor-control box 220 to the two motors. The control is of the usual type, the circuit to motor 206 remaining closed until the circuit to motor 208 is closed and then automatically opening, and vice versa.

The exact timing depends upon the speed with which the dampers or louvers 200 can be operated, and the speed with which the high-speed motor 208 accelerates to full speed when turned on. If the dampers can be moved very rapidly, then the arrangement is such that as soon as the contactor mechanism operates the high speed motor is thrown in, while at the same time the solenoid pulls the weighbeam 34 back and partially closes the dampers 200, so that at the higher speed of blower operation no more than the desired correction in pressure takes place.

If the dampers 200 are too heavy for rapid operation, then a suitable contact or switch (indicated diagrammatically at 222) is wired in series between the control box 220 and the motor 208, so that the motor is not actually turned on until the dampers approach the necessary partially closed position. It is of course preferable to have the damper position momentarily disturb the furnace pressure, rather than the motor speed, if a choice must be made, because the disturbance caused by the damper takes place more gradually and can be more completely corrected for quickly by the regulator.

The slow-speed motor 206, as explained, has the usual centrifugal cutout, so that in stepping down from high to low speed the motor 206 is not actually thrown in until the blower speed has dropped almost to the speed of motor 206. In stepping the speed down, therefore, the sequence is:

1. The contact is made by the regulator, disconnecting the motor 208.
2. The solenoid pulls the balance lever 34 back, causing the regulator to shift the damper 200 toward open position. This solenoid may be built to be of such strength that the damper will open at substantially a rate corresponding to the rate at which the blower 204 slows down.
3. When the blower 204 has slowed down sufficiently, the motor 206 cuts in.

The high and low speed motors 206 and 208, the control 220, the switch-over device 216, the synchronizing switch 222, and the push-button control 218 are all of standard construction, and are therefore not described in detail.

Figure 6 shows the device arranged to correlate the position of a shutter or damper 300, controlling the air from a centrifugal blower 304, with the speed of a motor 306 driving the blower. The speed of the motor 306 is controlled by means such as a rheostat 308 operated by a reversible motor 310 connected to the leads 180—

181—182 and controlled as described for the motor 20.

In this arrangement, when the damper 300 reaches its extreme open position the rheostat 308 is automatically stepped up one more point, while whenever the damper 300 reaches a predetermined relatively closed position the rheostat is automatically stepped back one point. In each case the damper 300 is shifted (by the action of magnet 184 or 185) quickly to its opposite position in anticipation of the result of the new motor speed.

Figure 7 shows how the air pressure, instead of changing up and down in a series of steps as would be the case if the motor speed alone was depended on for adjustment, is varied substantially as a straight line. In other words, the rough adjustment is made by changing the motor speed, and a vernier adjustment is made by means of the damper 300. In this case, since the speed of the motor is changed by relatively small increments, it is not always necessary to insert the centrifugal cut-out switch as described for Figure 5.

While several illustrative embodiments have been described in detail, it is not my intention to limit the scope of the invention to those particular embodiments, or otherwise than by the terms of the appended claims.

I claim:

1. A regulating system comprising balance means connected to be affected in one sense or the other by a condition to be controlled, means for controlling said condition having actuating mechanism including a driving motor, power circuits for differently driving said motor to effect control of said controlling means, holding circuits for holding one or the other of said power circuits closed when energized, means actuated by substantial movements of the balance means in one sense or the other to close one or the other of the holding circuits, means operated by the closing of either holding circuit for returning the balance means toward its neutral position, and means operated by said return of the balance means for opening the holding circuit again.

2. A regulating system comprising balance means connected to be affected in one sense or the other by a condition to be controlled, means for controlling said condition having actuating mechanism including a reversible driving motor, power circuits for driving said motor in opposite directions to actuate said controlling means to restore the balance of the balance means, holding circuits for holding one or the other of said power circuits closed when energized, means actuated by substantial movements of the balance means in one sense or the other to close one or the other of the holding circuits to cause the motor to drive in a direction to cause a change in said condition to again balance the balance means, means operated by the closing of either holding circuit for returning the balance means toward its neutral position in advance of said change, and means operated by said return of the balance means for opening the holding circuit again.

3. A regulating system comprising means affected in one sense or the other by variations in a condition to be controlled and having an operating stroke produced by such variations, means for effecting compensating opposite variations in said condition, means rendered effective near the end of the stroke of the first means for initiating and continuing in the proper sense the operation of said compensating means and for concurrently reacting upon said first means to shift it toward neutral position in advance of the compensating change being brought about in said condition, and means rendered effective by said shifting of the first means a predetermined amount for terminating the actuation of the compensating means.

4. A regulating system comprising means affected in one sense or the other by variations in a condition to be controlled and having an operating stroke produced by such variations, electrically-driven means for effecting compensating opposite variations in said condition and which is provided with operating circuits, means rendered effective near the end of the stroke of the first means for closing one of said circuits to cause operation in the proper sense of said compensating means and for concurrently reacting upon said first means to shift it toward neutral position in advance of the compensating change being brought about in said condition, and means rendered effective by said shifting of the first means a predetermined amount for again opening said circuit of the compensating means.

5. A regulator comprising balance means adapted to be affected by a condition to be controlled, power-driven actuating means controlled by the balance means and adapted to be connected to agencies affecting said condition, a pair of magnetic devices for reacting upon the balance means in opposite directions, two sets of control circuits each including an actuator circuit adapted to be connected to an agency affecting said condition, a magnetically-actuated multiple switch for each set of circuits and each of which has three switch parts one of which opens and closes the corresponding actuator circuit, a circuit for each of said magnetic devices which includes another of the switch parts of the corresponding multiple switch, a holding circuit for each multiple switch which includes the third switch part of its multiple switch, power lines, and means for connecting the power lines to said circuits including two sets of three contacts each which sets are closed by movement of the balance means in opposite directions, one contact of each set acting when closed to actuate the corresponding magnetically-actuated switch to close it and the second one being arranged in the corresponding actuator circuit and the third one being in the corresponding holding circuit.

6. A regulator comprising balance means adapted to be affected by a condition to be controlled, a pair of magnetic devices for reacting upon the balance means in opposite directions, two sets of control circuits each including an actuator circuit adapted to be connected to an agency affecting said condition, a magnetically-actuated multiple switch for each set of circuits and each of which has three switch parts one of which opens and closes the corresponding actuator circuit, a circuit for each of said magnetic devices which includes another of the switch parts of the corresponding multiple switch, a holding circuit for each multiple switch which includes the third switch part of its multiple switch, power lines, and means for connecting the power lines to said circuits including two sets of three contacts each which sets are closed by movement of the balance means in opposite directions, one contact of each set acting when closed to actuate the corresponding magnetically-actuated switch to close it and the second one being arranged in the corresponding actuator circuit and the third one being in the corresponding holding circuit.

7. A regulator comprising balance means adapted to be affected by a condition to be controlled, a pair of magnetic devices for reacting upon the balance means in opposite directions, two sets of control circuits each including an actuator circuit adapted to be connected to an agency affecting said condition, a magnetically-actuated multiple switch for each set of circuits and each of which has three switch parts one of which opens and closes the corresponding actuator circuit, a circuit for each of said magnetic devices which includes another of the switch parts of the corresponding multiple switch, a holding circuit for each multiple switch which includes the third switch part of its multiple switch, power lines, and means for connecting the power lines to said circuits including two sets of three contacts each which sets are closed by movement of the balance means in opposite directions, one contact of each set acting when closed to actuate the corresponding magnetically-actuated switch to close it and the second one being arranged in the corresponding actuator circuit and the third one being in the corresponding holding circuit, the contacts of each set being closed successively by movement of the balance means in the corresponding direction.

8. A regulator comprising balance means adapted to be affected by a condition to be controlled, a pair of magnetic devices for reacting upon the balance means in opposite directions, two sets of control circuits each including an actuator circuit adapted to be connected to an agency affecting said condition, a magnetically-actuated multiple switch for each set of circuits and each of which has three switch parts one of which opens and closes the corresponding actuator circuit, a circuit for each of said magnetic devices which includes another of the switch parts of the corresponding multiple switch, a holding circuit for each multiple switch which includes the third switch part of its multiple switch, power lines, and means for connecting the power lines to said circuits including two sets of three contacts each which sets are closed by movement of the balance means in opposite directions, one contact of each set acting when closed to actuate the corresponding magnetically-actuated switch to close it and the second one being arranged in the corresponding actuator circuit and the third one being in the corresponding holding circuit, the contacts of each set being closed successively by movement of the balance means in the corresponding direction, the first to be closed being that of the holding circuit and the second being that of the actuator circuit and the third being that for the magnetically-actuated multiple switch, whereby the holding circuit and the actuator circuit will not be closed until the third contact is engaged and whereby the magnetically-actuated switch will remain closed until all three contacts are broken again.

9. A regulator comprising balance means adapted to be affected by a condition to be controlled, a pair of magnetic devices for reacting upon the balance means in opposite directions, two sets of control circuits each including an actuator circuit adapted to be connected to an agency affecting said condition, a magnetically-actuated multiple switch for each set of circuits and each of which has three switch parts one of which opens and closes the corresponding actuator circuit, a circuit for each of said magnetic devices which includes another of the switch parts of the corresponding multiple switch, a holding circuit for each multiple switch which includes the third switch part of its multiple switch, power lines, and means for connecting the power lines to said circuits including two sets of three contacts each which sets are closed by movement of the balance means in opposite directions, one contact of each set acting when closed to actuate the corresponding magnetically-actuated switch to close it and the second one being arranged in the corresponding actuator circuit and the third one being in the corresponding holding circuit, the contacts of each set being closed successively by movement of the balance means in the corresponding direction, said contacts being yieldingly mounted at different points to permit such successive closing.

10. A regulator comprising balance means adapted to be affected by a condition to be controlled, a pair of magnetic devices for reacting upon the balance means in opposite directions, two sets of control circuits each including an actuator circuit adapted to be connected to an agency affecting said condition, a magnetically-actuated multiple switch for each set of circuits and each of which has three switch parts one of which opens and closes the corresponding actuator circuit, a circuit for each of said magnetic devices which includes another of the switch parts of the corresponding multiple switch, a holding circuit for each multiple switch which includes the third switch part of its multiple switch, power lines, and means for connecting the power lines to said circuits including two sets of three contacts each which sets are closed by movement of the balance means in opposite directions, one contact of each set acting when closed to actuate the corresponding magnetically-actuated switch to close it and the second one being arranged in the corresponding actuator circuit and the third one being in the corresponding holding circuit, the contacts of each set being closed successively by movement of the balance means in the corresponding direction, said regulator having a power-operated device controlled by the balance means and which opens and closes said contacts.

11. A regulator comprising balance means adapted to be affected by a condition to be controlled, a pair of magnetic devices for reacting upon the balance means in opposite directions, two sets of control circuits each including an actuator circuit adapted to be connected to an agency affecting said condition, a magnetically-actuated multiple switch for each set of circuits and each of which has three switch parts one of which opens and closes the corresponding actuator circuit, a circuit for each of said magnetic devices which includes another of the switch parts of the corresponding multiple switch, a holding circuit for each multiple switch which includes the third switch part of its multiple switch, power lines, and means for connecting the power lines to said circuits including two sets of three contacts each which sets are closed by movement of the balance means in opposite directions, one contact of each set acting when closed to actuate the corresponding magnetically-actuated switch to close it and the second one being arranged in the corresponding actuator circuit and the third one being in the corresponding holding circuit, the contacts of each set being closed successively by movement of the balance means in the corresponding direction, said contacts being yieldingly mounted at different points to permit such successive closing, said regulator having a power-operated device controlled by the balance means and which opens and closes said contacts.

12. A regulator comprising balance means adapted to be affected by a condition to be controlled, a pair of magnetic devices for reacting upon the balance means in opposite directions, two sets of control circuits each including an actuator circuit adapted to be connected to an agency affecting said condition, a magnetically-actuated multiple switch for each set of circuits and each of which has three switch parts one of which opens and closes the corresponding actuator circuit, a circuit for each of said magnetic devices which includes another of the switch parts of the corresponding multiple switch, a holding circuit for each multiple switch which includes the third switch part of its multiple switch, power lines, and means for connecting the power lines to said circuits including two sets of three contacts each which sets are closed by movement of the balance means in opposite directions, one contact of each set acting when closed to actuate the corresponding magnetically-actuated switch to close it and the second one being arranged in the corresponding actuator circuit and the third one being in the corresponding holding circuit, the contacts of each set being closed successively by movement of the balance means in the corresponding direction, said regulator having a power-operated device controlled by the balance means and which opens and closes said contacts, and said regulator also having a fluid power mechanism provided with a pilot valve and with a return motion means connected to the power mechanism and to the power-operated device and to the pilot valve.

ALBERT F. SPITZGLASS.